S. MYERS.
Fruit-Drier.
No. 197,562.  Patented Nov. 27, 1877.
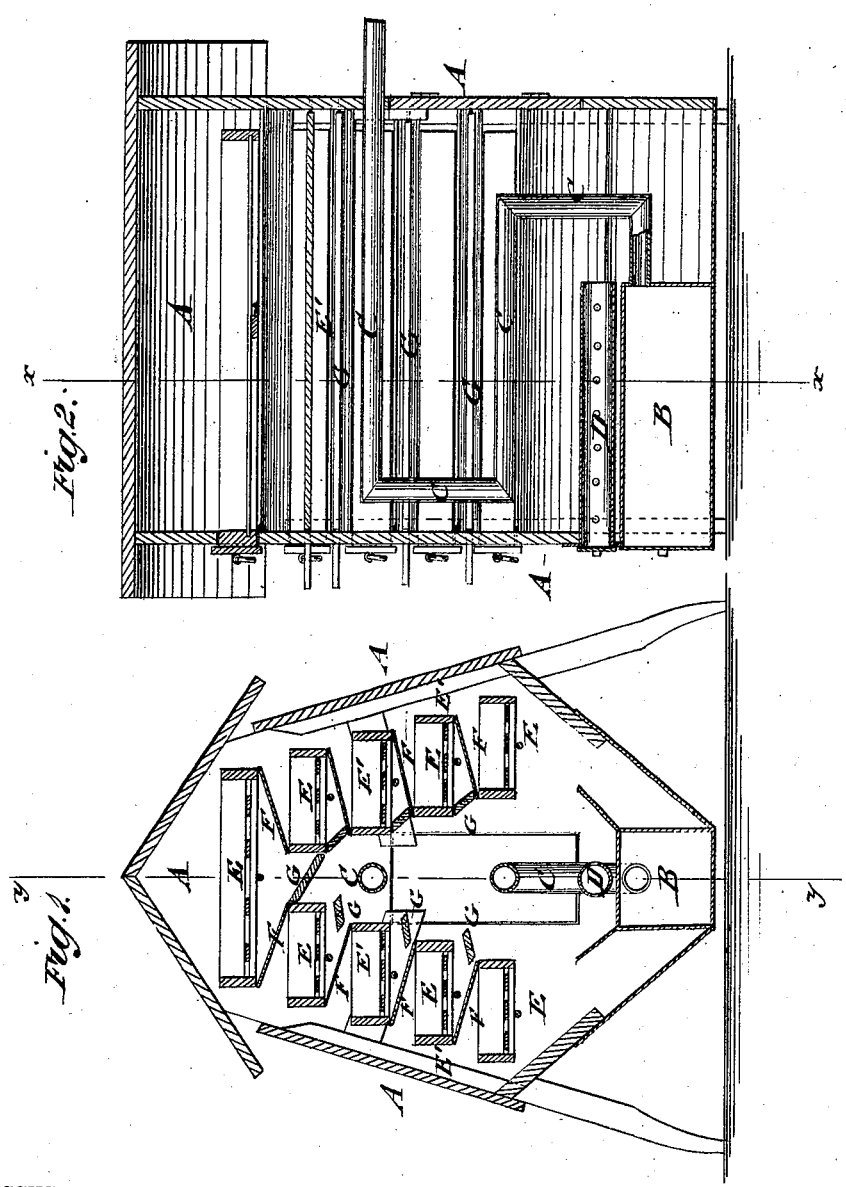
WITNESSES:
Francis McArdle.
J. H. Scarborough.
INVENTOR:
S. Myers.
BY
ATTORNEYS.

UNITED STATES PATENT OFFICE.

SAMUEL MYERS, OF ADAMSBOROUGH, ASSIGNOR TO HIMSELF AND W. D. PLOTT, OF SHARPSVILLE, INDIANA.

IMPROVEMENT IN FRUIT-DRIERS.

Specification forming part of Letters Patent No. 197,562, dated November 27, 1877; application filed September 29, 1877.

*To all whom it may concern:*

Be it known that I, SAMUEL MYERS, of Adamsborough, in the county of Cass and State of Indiana, have invented a new and Improved Fruit-Drier, of which the following is a specification:

In the accompanying drawings, Figure 1 represents a vertical transverse section of my improved fruit-drier on line $x\,x$, Fig. 2; and Fig. 2, a vertical longitudinal section of the same on line $y\,y$, Fig. 1.

Similar letters of reference indicate corresponding parts.

The object of this invention is to so improve the fruit-drier for which Letters Patent were granted to me under date of April 24, 1877, No. 189,952, that the supply of heat to the fruit trays or drawers may be regulated at will, and the different drawers be made independent of each other in the drying process, by having the heat controlled and appropriated to the condition of the fruit in the same; and the invention consists of the connection, with the drawers or trays, of diagonal partitions and pivoted valves, that open or close the space between the shelves and partitions, for admitting or excluding the heat to or from the trays.

By reference to the drawings, A represents the outer wooden or sheet-metal casing of my improved fruit-drier, which is supported on suitable legs, and made tapering toward the top. At the lower part of the drier is a central heater, B, of heavy sheet iron or metal, which is supported on the sheet-iron bottom of the drier, and readily renewed when burned out.

The smoke is carried backward and forward in the drier by a pipe, C, with suitable elbows, and, finally, to the chimney.

A perforated air-tube, D, above the heater, draws in the air and distributes the same when heated in the drier.

The drier has ventilated spaces below its top or cover, which, in connection with the heater and air-pipe, establish a rapid current of heated air over and through the drawers or trays E, on which the fruit is placed for drying. The drawers or trays are placed at some distance from the side E' of the case, and are arranged relatively as shown in Fig. 1. The drawers or trays E are supported on suitable rods, and moved forward or back.

Below the drawers E are arranged diagonal partitions F, that extend from the inner upper edge of one tray, E', to the outer lower edge of the next adjoining tray above, so as to conduct the heated air directly from the central and hottest part of the drier to the trays, and then through the same, with the evaporated moisture, along the side walls, to the ventilating-openings and to the outside.

Between the inner lower edge of each tray E' and the lower edge of each diagonal partition F is arranged a pivoted valve or gage, G, that is readily set from the outside of the drier into partly or entirely open or closed position, so that the supply of heated air to the trays may be controlled and adapted to the condition of the fruit in the same.

The valves are opened or closed according to the condition of the fruit, green fruit requiring more heat than dry or partly-dried fruit, the valves admitting, also, the confinement of the heat in the central chamber of the drier, or the throwing of the whole capacity of heat on any one or more trays, so that by the drier fruits in different stages of the drying process may be operated upon, and the trays changed at the will of the operator.

There is no waste of heat, nor is the heated air used a second time, for when the same has once passed through the tray it has done its work, and is passed off through the ventilating-openings at the top.

The drier admits a continuous working, the trays being emptied and refilled as the fruit is getting dry in each tray.

Having thus described my invention, I claim as new and desire to secure by Letters Patent—

In a fruit-drier, the combination of the casing A, having central heater B, and perforated air-supply pipe, with the sliding drawers or trays E, arranged at some distance from the side of the case, and relatively as shown, intermediate diagonal partitions F, and pivoted valves or heat-gages G, for regulating the heat according to the condition of the fruit on the trays, substantially as and for the purpose set forth.

SAMUEL MYERS.

Witnesses:
CHAS. W. FISK,
JACOB MUSSELMAN.